(12) United States Patent
McCarthy

(10) Patent No.: US 9,080,864 B1
(45) Date of Patent: Jul. 14, 2015

(54) PIPE ALIGNMENT DEVICE

(71) Applicant: Sherwin W. McCarthy, Brooklyn, NY (US)

(72) Inventor: Sherwin W. McCarthy, Brooklyn, NY (US)

(*) Notice: Subject to any disclaimer, the term of this patent is extended or adjusted under 35 U.S.C. 154(b) by 245 days.

(21) Appl. No.: 13/850,442

(22) Filed: Mar. 26, 2013

(51) Int. Cl.
*G01C 15/00* (2006.01)
*G01B 11/27* (2006.01)

(52) U.S. Cl.
CPC .............. *G01B 11/27* (2013.01); *G01C 15/004* (2013.01)

(58) Field of Classification Search
CPC .. G01C 15/004; G01C 15/002; G01C 15/105; G01C 15/008; G01B 11/27
USPC ..................... 33/286, DIG. 21, 228
See application file for complete search history.

(56) References Cited

U.S. PATENT DOCUMENTS

| | | | |
|---|---|---|---|
| 4,700,489 A | 10/1987 | Vasile | |
| 5,025,567 A | 6/1991 | McWilliams et al. | |
| 5,568,265 A * | 10/1996 | Matthews | 356/399 |
| 6,124,935 A * | 9/2000 | Matthews | 356/399 |
| 6,286,219 B1 * | 9/2001 | Palumbo, II | 33/286 |
| 6,332,277 B1 | 12/2001 | Owoc et al. | |
| 6,658,752 B1 | 12/2003 | Bonaventura, Jr. | |
| D488,729 S | 4/2004 | Golaszewski et al. | |
| 2002/0062570 A1* | 5/2002 | Palumbo, II et al. | 33/286 |
| 2004/0111902 A1* | 6/2004 | Fletcher | 33/286 |
| 2004/0172839 A1 | 9/2004 | Zirk et al. | |
| 2008/0141546 A1 | 6/2008 | Strutt et al. | |
| 2012/0117813 A1* | 5/2012 | Stevenson et al. | 33/286 |
| 2012/0297635 A1* | 11/2012 | Mickow | 33/228 |
| 2014/0115907 A1* | 5/2014 | Gamon | 33/286 |

* cited by examiner

*Primary Examiner* — Yaritza Guadalupe-McCall
(74) *Attorney, Agent, or Firm* — Kyle A. Fletcher, Esq.

(57) ABSTRACT

The pipe alignment device is a device adapted for use with an existing pipe in order to project a laser line from a distal end of the existing pipe. The pipe alignment device includes an adaptor coupling that enables a leveling laser and spirit level to attach to the distal end of the existing pipe in order to determine a level alignment of the leveling laser. The leveling laser and the spirit level are mounted on an alignment housing that is able to attach onto the adaptor coupling. The adaptor coupling includes a plurality of set screws that secure the adaptor coupling to the distal end of the existing pipe as well as to secure the alignment housing to the adaptor coupling.

14 Claims, 4 Drawing Sheets

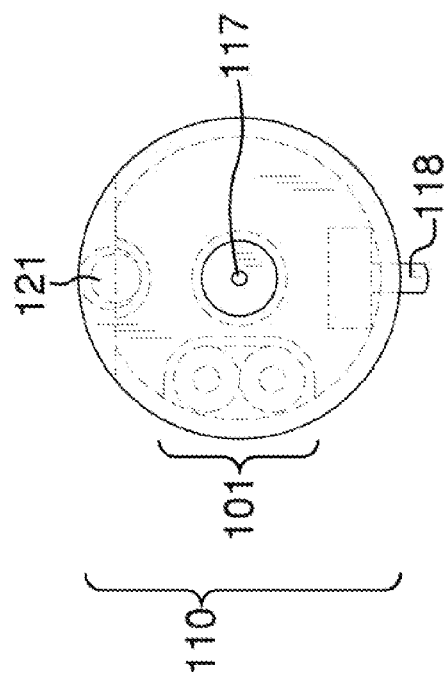
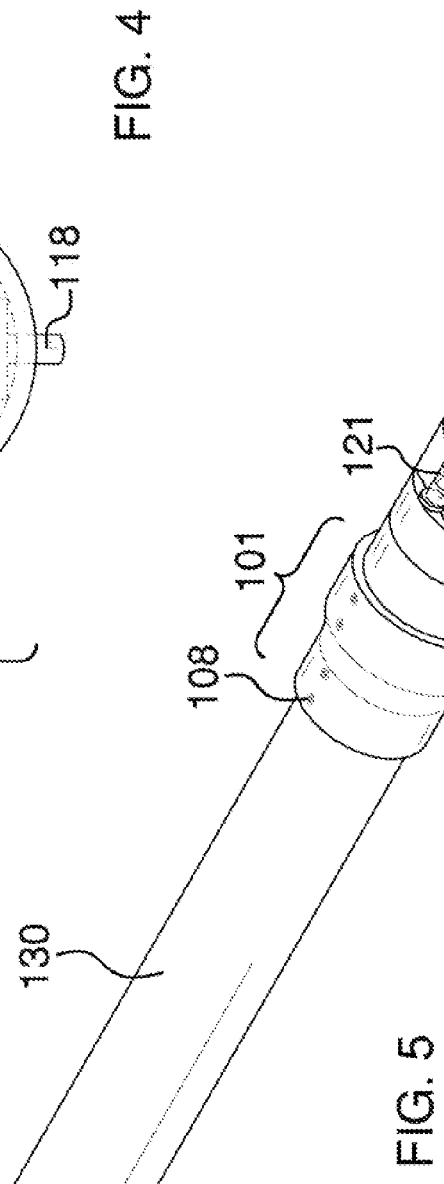

PIPE ALIGNMENT DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of pipe aligning jigs, more specifically, an alignment device that is able to attach onto an open end of a pipe.

Pipe fitting is a difficult skill to master. This is especially true where open ends of a pipe are difficult to reach, and require assistance in determining a level point in space therefrom. What is needed is a device that aids a pipe fitter in ascertaining a leveled point in space, which is projected from the distal end of the existing pipe. The device of the present application addresses this need by providing an alignment device that is adapted or configured for use with the distal end of the existing pipe.

B. Discussion of the Prior Art

As will be discussed immediately below, no prior art discloses a pipe alignment device that includes an adaptor coupling that enables a leveling laser and spirit level to attach to a distal end of a pipe in order to determine a level alignment of the leveling laser; wherein the adaptor coupling is configured to attach onto a distal end of a pipe; wherein the leveling laser and the spirit level are mounted on an alignment housing that is able to attach onto the adaptor coupling; wherein the leveling laser is oriented on a distal end of the alignment housing and directs the laser away from the distal end of the pipe that the adaptor coupling is attached onto; wherein the adaptor coupling includes a plurality of set screws that secure the adaptor coupling to the distal end of the pipe as well as to secure the alignment housing to the adaptor coupling; wherein the set screws also provides means for adjustment of the alignment housing with respect to the distal end of the pipe.

The Bonaventura, Jr. Patent (U.S. Pat. No. 6,658,752) discloses an extensible carpenter's level. However, the level is unable to attach itself onto a distal end of a pipe, and project a leveled laser there from.

The Strutt et al. Patent Application Publication (U.S. Pub. No. 2006/0141546) discloses a twin, spirit level wherein a receptacle provides a storage for the second level. Again, the level is unable to secure itself onto a distal end of an existing pipe in order to project a leveled laser there from.

The Owoc et al. Patent (U.S. Pat. No. 6,332,277) discloses a level with a band securing apparatus wherein a separate band storage compartment may also be provided. Again, the level is unable to secure itself onto a distal end of an existing pipe in order to project a leveled laser there from.

The McWilliams et al. Patent (U.S. Pat. No. 5,025,567) discloses an illuminated spirit level with storage for a spare electrical bulb. Again, the spirit level does not secure itself onto an open distal end of an existing pipe so as to project a leveled laser there from to aid in pipe fitting.

The Golaszewski et al. Patent (U.S. Pat. No. Des. 488,729) illustrates an ornamental design for a multi-purpose hand tool that includes tape measure, chalk line, level, angle replicator, and plumb bob in side compartment. However, the hand tool is unable to attach onto an open, distal end of an existing pipe in order to project a leveled laser line there from.

The Vasile Patent (U.S. Pat. No. 4,700,489) discloses a square-level measuring tool that provides a combination of several tools and includes a tape measure, levels, stud locator and marker, packaged into a single unit. Again, the tool is not for use with the distal open end of an existing pipe.

The Zirk et al. Patent Application Publication (U.S. Pub. No. 2004/0172839) discloses a multi-use tool containing a tape measure, with tape lock, a laser device, a pencil sharpener, level indicators, a pencil holder, a storage compartment, and rotatable straight edge. Again, the tool is unable to secure itself onto the open distal end of a pipe for use in aligning a leveled laser line therefrom, and in use with pipe fitting.

While the above-described devices fulfill their respective and particular objects and requirements, they do not describe a pipe alignment device that includes an adaptor coupling that enables a leveling laser and spirit level to attach to a distal end of a pipe in order to determine a level alignment of the leveling laser; wherein the adaptor coupling is configured to attach onto a distal end of a pipe; wherein the leveling laser and the spirit level are mounted on an alignment housing that is able to attach onto the adaptor coupling; wherein the leveling laser is oriented on a distal end of the alignment housing and directs the laser away from the distal end of the pipe that the adaptor coupling is attached onto; wherein the adaptor coupling includes a plurality of set screws that secure the adaptor coupling to the distal end of the pipe as well as to secure the alignment housing to the adaptor coupling; wherein the set screws also provide means for adjustment of the alignment housing with respect to the distal end of the pipe. In this regard, the pipe alignment device departs from the conventional concepts and designs of the prior art.

SUMMARY OF THE INVENTION

The pipe alignment device is a device adapted for use with an existing pipe in order to project a laser line from a distal end of the existing pipe. The pipe alignment device includes an adaptor coupling that enables a leveling laser and spirit level to attach to the distal end of the existing pipe in order to determine a level alignment of the leveling laser. The leveling laser and the spirit level are mounted on an alignment housing that is able to attach onto the adaptor coupling. The leveling laser is oriented on a distal end of the alignment housing and directs the laser away from the distal end of the existing pipe that the adaptor coupling is attached onto. The adaptor coupling includes a plurality of set screws that secure the adaptor coupling to the distal end of the existing pipe as well as to secure the alignment housing to the adaptor coupling. The set screws also provide means for adjustment of the alignment housing with respect to the distal end of the existing pipe.

It is an object of the invention to provide a device that attaches itself onto a distal end of an existing pipe in order to direct a leveling laser therefrom in order to aid in pipe fitting.

A further object of the invention is to provide a spirit level and leveling laser that work in unison to insure that the leveling laser is projected at a level orientation.

A further object of the invention is to provide an alignment housing that supports the leveling laser as well as the spirit level thereon, and which connects to an adaptor coupling.

A further object of the invention is to provide an adaptor coupling that secures the invention onto the distal end of the existing pipe as well as to enable attachment of the alignment housing thereto.

Another object of the invention is to provide a plurality of set screws on the adaptor coupling in order to provide means of securement as well as means of adjusting the leveling laser with respect to the distal end of the existing pipe.

These together with additional objects, features and advantages of the pipe alignment device will be readily apparent to those of ordinary skill in the art upon reading the following detailed description of presently preferred, but nonetheless illustrative, embodiments of the pipe alignment device when taken in conjunction with the accompanying drawings.

In this respect, before explaining the current embodiments of the pipe alignment device in detail, it is to be understood that the pipe alignment device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pipe alignment device.

It is therefore important that the claims be regarded as including such equivalent construction insofar as they do not depart from the spirit and scope of the pipe alignment device. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 4 illustrates a distal end of the alignment housing and detailing the various components integrated therewith; and FIG. 5 illustrates a perspective view of the pipe alignment device in use with an existing pipe.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
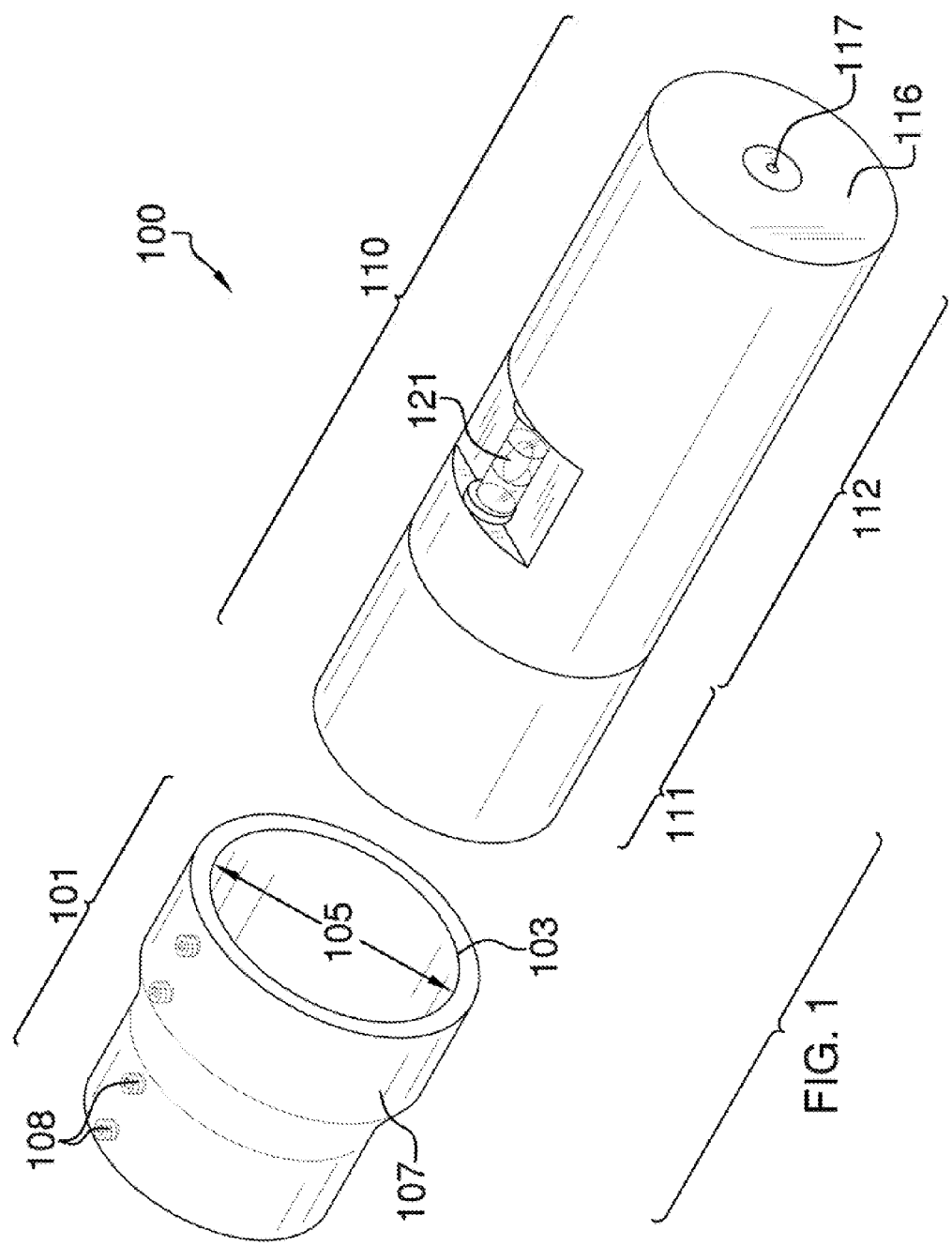
FIG. 1 illustrates a perspective view of the pipe alignment device whereby the adaptor coupling is separated from the alignment housing.
Figure 2:
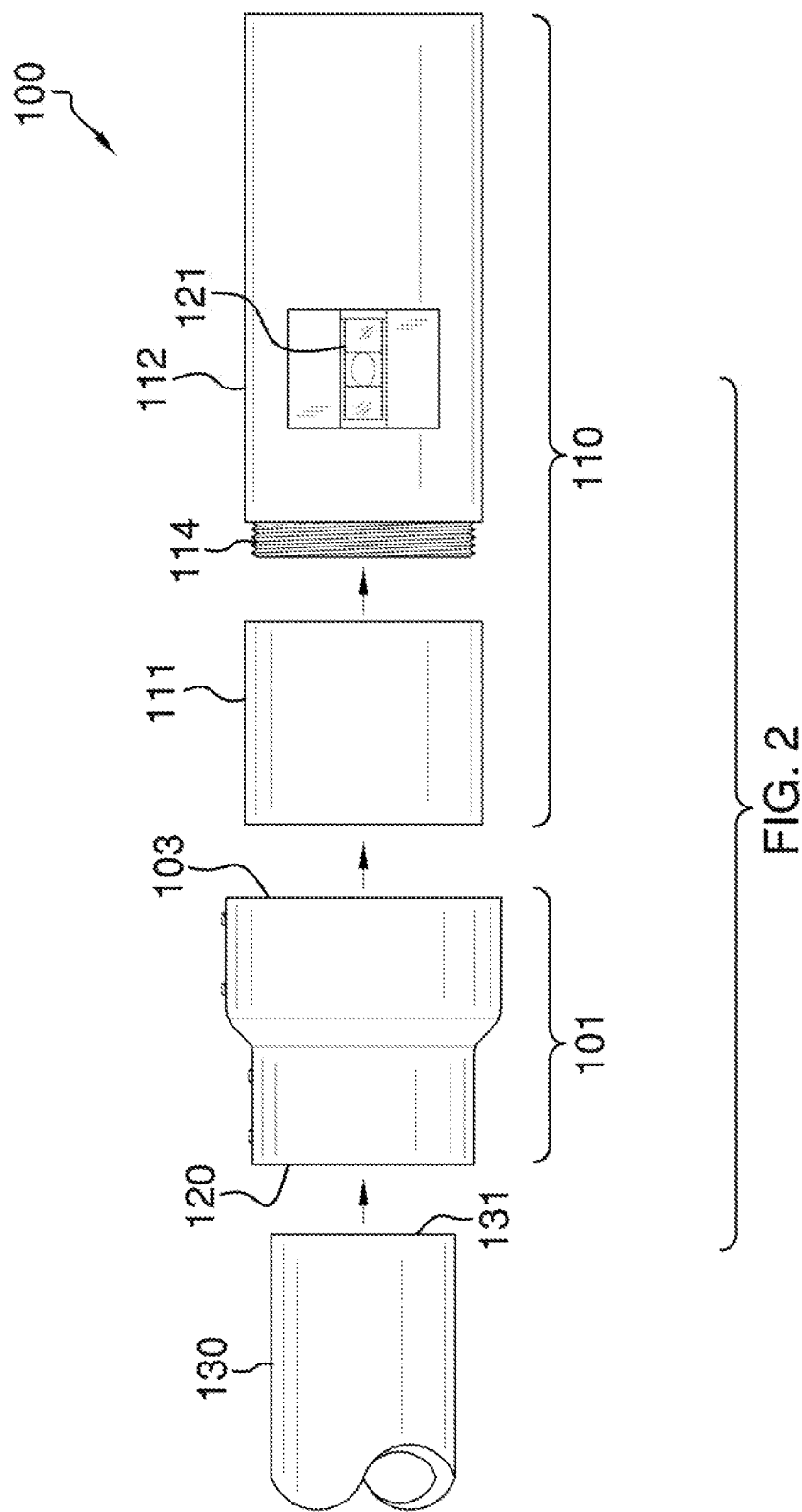
FIG. 2 illustrates a side, exploded view of the pipe alignment device aligned adjacent with a distal end of the existing pipe.
Figure 3:
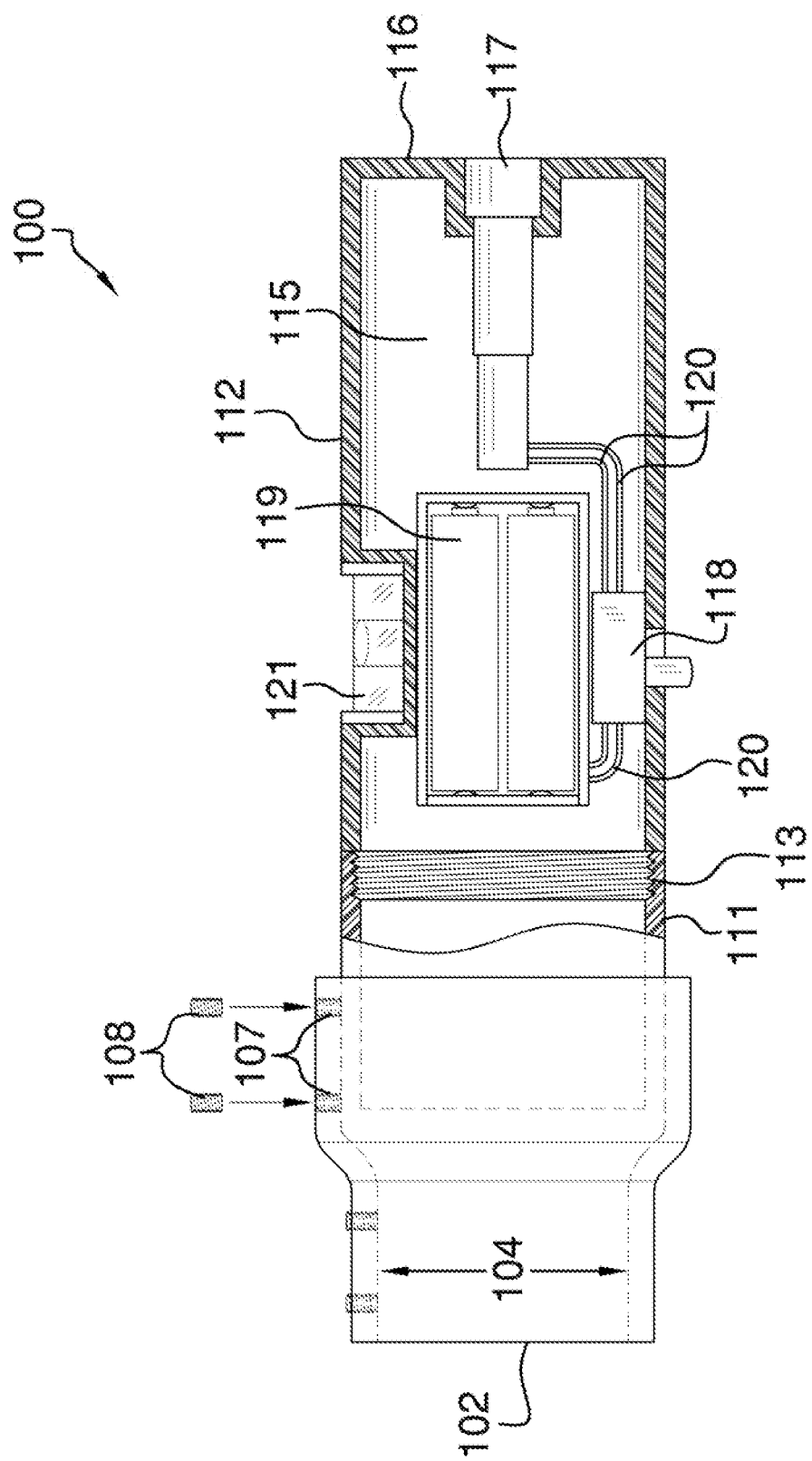
FIG. 3 illustrates a partial cut-away side view of the pipe alignment device, and which details the various components associated with the alignment housing.

Detailed reference will now be made to the preferred embodiment of the present invention, examples of which are illustrated in FIGS. 1-5. A pipe alignment device 100 (hereinafter invention) includes an adaptor coupling 101 and an alignment housing 110. The adaptor coupling 101 is further defined as a first opening 102 and a second opening 103. The first opening 102 has a first inner diameter 104 that is less than a second inner diameter 105 of the second opening 103. The adaptor coupling 101 includes a plurality of screw holes 106 that are linearly aligned along an outer surface 107 of the adaptor coupling 101.

The adaptor coupling 101 includes set screws 106 that work to secure the adaptor coupling 101 onto an open distal end 131 of an existing pipe 130 as well as the alignment housing 110. Moreover, the first opening 102 is configured for use in securing the adaptor coupling 101 onto the open distal end 131 of the existing pipe 130. The second opening 103 of the adaptor coupling 101 enables the alignment housing 110 to be secured thereto. The set screws 108 are used to secure and adjust the orientation of the alignment housing 110 with respect to the existing pipe 130.

The alignment housing 110 is composed of an end cap 111 and a laser body 112. The end cap 111 includes inner threading 113 that corresponds with external threading 114 located on the laser body 112. The laser body 112 is secured to the end cap 111 via the inner threading 113 and the external threading 114. The end cap 111 is removable from the laser body 112 in order for an interior 115 of the alignment housing 110 to be accessed. The laser body 112 is further defined with a laser distal end 116 that is outfitted with a leveling laser 117 thereon. Moreover, the leveling laser 117 is centrally aligned on the laser distal end 116.

It shall be noted that the end cap 111 and the laser body 112 are of cylindrical construction, which thereby enables the alignment housing 110 to be secured to the adaptor coupling 101. It shall also be noted that the first opening 102 and the second opening 103 of the adaptor coupling 101 are circular in order to enable connection with the existing pipe 130 as well as with the alignment housing 110. It shall also be noted that the end cap 111 is inserted into and secured to the second opening 103 of the adaptor coupling 101 whereas the laser distal end 116 is extended from the existing pipe 130.

The leveling laser 117 is in wired communication with an on/off switch 118 located elsewhere on the laser body 112. The on/off switch 118 controls electrical flow to the leveling laser 117 from a powering member 119. The powering member 119 is comprised of at least one battery that is situated in the interior of the laser body 112. Wiring 120 connects the powering member 119 to the on/off switch 118, and wiring 120 connects the on/off switch 118 to the leveling laser 117. It shall be noted that the on/off switch 118 is accessible from outside of the laser body 112.

The laser body 112 also includes a spirit level 121. The spirit level 121 is configured to determine the levelness of the laser body 112 with respect to the ground. Moreover, the spirit level 121 is located elsewhere on the laser body 112 with respect to the on/off switch 118. The spirit level 121 is well known in the art, and is included with the invention 100 in order to determine the levelness of the alignment housing 110 being disposed of from the open distal end 131 of the existing pipe 130. The spirit level 121 indicates levelness, and is used in connection with the set screws 108 to level the alignment housing 110 with respect to the existing pipe 130.

Once the alignment housing 110 is leveled with respect to the existing pipe 130, the leveling laser 117 is used to project a laser 125 away from the open distal end 131 of the existing pipe 130 (see FIG. 5).

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A pipe alignment device comprising:
an adaptor coupling that is adapted to fit onto and secure itself to an open distal end of an existing pipe;
wherein the adaptor coupling is also able to secure an alignment housing thereon, and from which a leveling laser projects a laser line away from the existing pipe for use in pipe fitting;
wherein the alignment housing includes a spirit level that enables adjustment of the alignment housing with respect to the existing pipe;
wherein the adaptor coupling is further defined as a first opening and a second opening; wherein the first opening has a first inner diameter that is less than a second inner diameter of the second opening;
wherein the adaptor coupling includes a plurality of screw holes that are linearly aligned along an outer surface of the adaptor coupling; wherein a plurality of set screws work to secure the adaptor coupling onto the open distal end of the existing pipe as well as the alignment housing.

2. The pipe alignment device as described in claim 1 wherein the first opening is configured for use in securing the adaptor coupling onto the open distal end of the existing pipe; wherein the second opening of the adaptor coupling enables the alignment housing to be secured thereto; wherein the set screws are used to secure and adjust the orientation of the alignment housing with respect to the existing pipe.

3. The pipe alignment device as described in claim 2 wherein the alignment housing is composed of an end cap and a laser body; wherein the end cap includes inner threading that corresponds with external threading located on the laser body; wherein the laser body is secured to the end cap via the inner threading and the external threading; wherein the end cap is removable from the laser body in order for an interior of the alignment housing to be accessed.

4. The pipe alignment device as described in claim 3 wherein the laser body is further defined with a laser distal end that is outfitted with the leveling laser thereon; wherein the leveling laser is centrally aligned on the laser distal end.

5. The pipe alignment device as described in claim 4 wherein the end cap and the laser body are of cylindrical construction, which thereby enables the alignment housing to be secured to the adaptor coupling; wherein the first opening and the second opening of the adaptor coupling are circular in order to enable connection with the existing pipe as well as with the alignment housing; wherein the end cap is inserted into and secured to the second opening of the adaptor coupling whereas the laser distal end is extended from the existing pipe.

6. The pipe alignment device as described in claim 5 wherein the leveling laser is in wired communication with an on/off switch located elsewhere on the laser body; wherein the on/off switch controls electrical flow to the leveling laser from a powering member.

7. The pipe alignment device as described in claim 6 wherein the powering member is comprised of at least one battery that is situated in the interior of the laser body; wherein wiring connects the powering member to the on/off switch, and wiring connects the on/off switch to the leveling laser; wherein the on/off switch is accessible from outside of the laser body.

8. The pipe alignment device as described in claim 7 wherein the laser body also includes the spirit level; wherein the spirit level is configured to determine the levelness of the laser body with respect to the ground, and in order to level the alignment housing with respect to the open distal end of the existing pipe; wherein the spirit level is located elsewhere on the laser body with respect to the on/off switch.

9. A pipe alignment device comprising:
an adaptor coupling that is adapted to fit onto and secure itself to an open distal end of an existing pipe;
wherein the adaptor coupling is also able to secure an alignment housing thereon, and from which a leveling laser projects a laser line away from the existing pipe for use in pipe fitting;
wherein the alignment housing includes a spirit level that enables adjustment of the alignment housing with respect to the existing pipe;
wherein the adaptor coupling is further defined as a first opening and a second opening; wherein the first opening has a first inner diameter that is less than a second inner diameter of the second opening;
wherein the adaptor coupling includes a plurality of screw holes that are linearly aligned along an outer surface of the adaptor coupling; wherein the set screws work to secure the adaptor coupling onto the open distal end of the existing pipe as well as the alignment housing;
wherein the first opening is configured for use in securing the adaptor coupling onto the open distal end of the existing pipe; wherein the second opening of the adaptor coupling enables the alignment housing to be secured thereto; wherein the set screws are used to secure and adjust the orientation of the alignment housing with respect to the existing pipe;
wherein the alignment housing is composed of an end cap and a laser body; wherein the end cap includes inner threading that corresponds with external threading located on the laser body; wherein the laser body is secured to the end cap via the inner threading and the external threading; wherein the end cap is removable from the laser body in order for an interior of the alignment housing to be accessed.

10. The pipe alignment device as described in claim 9 wherein the laser body is further defined with a laser distal end that is outfitted with the leveling laser thereon; wherein the leveling laser is centrally aligned on the laser distal end.

11. The pipe alignment device as described in claim 10 wherein the end cap and the laser body are of cylindrical construction, which thereby enables the alignment housing to be secured to the adaptor coupling; wherein the first opening and the second opening of the adaptor coupling are circular in order to enable connection with the existing pipe as well as with the alignment housing; wherein the end cap is inserted into and secured to the second opening of the adaptor coupling whereas the laser distal end is extended from the existing pipe.

12. The pipe alignment device as described in claim 11 wherein the leveling laser is in wired communication with an on/off switch located elsewhere on the laser body; wherein the on/off switch controls electrical flow to the leveling laser from a powering member.

13. The pipe alignment device as described in claim 12 wherein the powering member is comprised of at least one battery that is situated in the interior of the laser body;
   wherein wiring connects the powering member to the on/off switch, and wiring connects the on/off switch to the leveling laser; wherein the on/off switch is accessible from outside of the laser body.

14. The pipe alignment device as described in claim 13 wherein the laser body also includes the spirit level; wherein the spirit level is configured to determine the levelness of the laser body with respect to the ground, and in order to level the alignment housing with respect to the open distal end of the existing pipe; wherein the spirit level is located elsewhere on the laser body with respect to the on/off switch.

\* \* \* \* \*